(12) United States Patent
Almen

(10) Patent No.: US 6,379,799 B1
(45) Date of Patent: Apr. 30, 2002

(54) LOW MOISTURE ABSORPTION EPOXY RESIN SYSTEMS WITH ALKYLATED DIAMINE HARDENERS

(75) Inventor: Gregory R. Almen, Mesa, AZ (US)

(73) Assignee: Cytec Technology Corp., Wilmington, DE (US)

( * ) Notice: Subject to any disclaimer, the term of this patent is extended or adjusted under 35 U.S.C. 154(b) by 0 days.

(21) Appl. No.: 09/605,376

(22) Filed: Jun. 29, 2000

(51) Int. Cl.$^7$ .................. B32B 27/38; B32B 27/04; C08L 63/00

(52) U.S. Cl. .................. 428/413; 428/297.4; 428/417; 523/427; 523/428; 523/429; 525/523; 525/524

(58) Field of Search .................. 428/417, 375, 428/901, 297.4, 413; 523/428, 429, 427, 523, 524

(56) References Cited

U.S. PATENT DOCUMENTS

| | | | | |
|---|---|---|---|---|
| 5,244,719 A | * | 9/1993 | Qureshi et al. | 428/245 |
| 5,360,840 A | * | 11/1994 | Chan et al. | 523/428 |
| 5,917,009 A | * | 6/1999 | Oosedo et al. | 528/480 |
| 5,928,767 A | * | 7/1999 | Gebhardt et al. | 428/209 |
| 5,985,431 A | * | 11/1999 | Oosedo et al. | 428/297.4 |
| 6,111,030 A | * | 8/2000 | Hartman | 525/420 |

* cited by examiner

*Primary Examiner*—Robert Dawson
*Assistant Examiner*—Michael J Feely
(74) *Attorney, Agent, or Firm*—Fitzpatrick, Cella, Harper & Scinto

(57) ABSTRACT

Resin systems containing a dicyclopentadiene-based epoxy resin and an ortho-alkylated aromatic diamine hardener exhibit low moisture absorption, high Tg and good retention of properties under hot and wet conditions. These properties make the resin systems especially useful in aerospace applications.

50 Claims, No Drawings

LOW MOISTURE ABSORPTION EPOXY RESIN SYSTEMS WITH ALKYLATED DIAMINE HARDENERS

BACKGROUND OF THE INVENTION

1. Field of the Invention

The invention is directed to epoxy resin systems, particularly low moisture absorption epoxy resin systems. The epoxy resin systems according to the invention have utility in aerospace manufacture, or other applications requiring resin systems having low moisture absorption and good retention of dimensional properties under hot and wet conditions. Prepregs, composites and resin transfer molding applications incorporating the epoxy resin systems of the invention are also disclosed.

2. Description of the Related Art

Advanced composites are high strength, high modulus materials which are finding increasing use as structural components in aerospace, automotive, and sporting goods applications. Typically, these composites comprise structural fibers such as carbon fibers in the form of woven cloth or continuous filaments embedded in a cured thermosetting resin matrix.

Most advanced composites are fabricated from prepregs, ready-to-mold sheets of fibrous reinforcement impregnated with uncured or partially cured resin. In order to be useful in commercial fabrication operations, prepreg matrix resin needs to have a long "outlife," typically defined as the period of time the prepreg can remain at room temperature and still be useful for making cured composites; that is, the prepreg must remain pliable and retain appropriate tack (stickiness). Pliability is conferred by the resin matrix, which should remain relatively soft and deformable without cracking. Outlife is sometimes referred to herein as "tack and drape outlife."

Resin systems containing an epoxide resin and aromatic amine hardener are often used in prepregs since they possess a balance of properties generally required for such applications. An early resin system extensively used in space applications was based on tetraglycidyl-methylenedianiline [TGMDA] epoxy resin and 4,4'-diaminodiphenylsulfone [4,4'-DDS]. This system has been used extensively in aerospace primary and secondary structures.

As a hardener, DDS has a low level of reactivity with epoxy resins at room temperature, and prepregs made using DDS-based systems have good out-life. The resulting fiber composites have high compressive strength, good fatigue characteristics, and low shrinkage during cure. Most epoxy formulations, including TGMDA, tend to absorb moisture (hygroscopic) which reduces their high temperature properties. Accordingly, there continues to be a need for resin systems and composites having reduced moisture absorption.

Other disadvantages associated with prior art epoxy/carbon fiber prepregs are a tendency toward brittleness and microcracking, and high cure temperature requirements, typically in the neighborhood of 350° F.

Typical state-of-the-art resin systems for aerospace applications include polycyanate-based resin systems. These resin systems exhibit relatively low moisture absorption, moderate to high toughness, low microcracking, and low dielectric constant. However, the high cost of polycyanate resins relative to epoxies is a disadvantage. Moreover, polycyanates are sensitive to moisture before cure, which makes special precautions necessary, such as the need to predry core materials to prevent blistering and delaminating during cure or postcure. Further, the laminate surfaces of polycyanate-based resin systems resist bonding, exhibit poor tack and drape and exhibit reduced mechanical outlife and storage life. In general, polycyanate-based resin systems require a 350° F. cure temperature. Those polycyanate systems having reduced cure temperatures exhibit especially poor tack and drape, and substantially reduced mechanical life and storage life. It has also been observed that, although initial moisture absorption is low for such systems, the moisture absorption in many cases continues to rise during long term moisture exposure and does not reach equilibrium.

SUMMARY OF THE INVENTION

It is an object of the present invention to provide an epoxy resin system having low moisture absorption that avoids the disadvantages and drawbacks associated with prior art resin systems. These resin systems are especially suitable for aerospace applications.

The resin system according to the invention has a first component which is generally formed by reacting dicyclopentadiene, epichlorohydrin and phenol to form a polyglycidyl derivative of a phenol-dicyclopentadiene epoxy polymer, and a second component which is an ortho-alkylated diamine hardener.

The epoxy resin of the instant invention has the following structural formula (I):

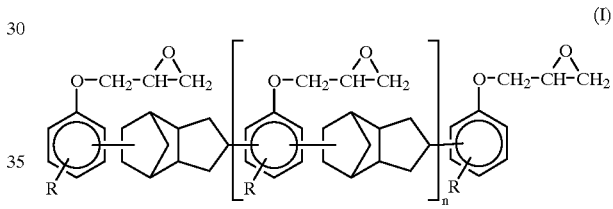

wherein R is hydrogen or halogen, and n is from 0 to about 0.5.

In a more preferred embodiment, R is hydrogen such that the phenol moiety is unsubstituted, and n is equal to about 0.2. An epoxy resin of this embodiment is available from Ciba-Geigy under the tradename TACTIX 556.

In general, the useful hardeners for the epoxy resin of the invention are aromatic hardeners preferably having a benzene skeleton in which substituted alkyl groups(s) are ortho to substituted amine groups(s).

In a more preferred embodiment, the ortho-alkylated aromatic compound has the following formula (II):

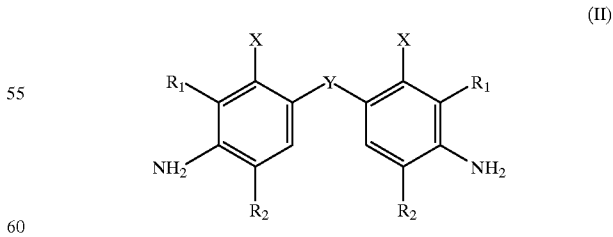

wherein Y is a direct bond, sulfur, oxygen, methyl, substituted methyl, or sulfoxy; $R_1$ and $R_2$ are each $C_1$–$C_4$ straight chain or branched alkyl groups and X is hydrogen, chlorine or bromine.

In a most preferred embodiment, Y is —$CH_2$—, and $R_1$ and $R_2$ are each ethyl. This diamine hardener, 4,4'- methylenebis(2,6-diethylaniline), is available from Lonza Group under the tradename Lonzacure® M-DEA.

In another preferred embodiment Y is —CH$_2$—, R$_1$ is isopropyl and R$_2$ is methyl. This diamine hardener, 4,4'-methylenebis(2-isopropyl-6-methylaniline), is available from Lonza Group under the tradename Lonzacure® M-MIPA.

In still another preferred embodiment, Y is —CH$_2$— and R$_1$ and each R$_2$ are isopropyl. This hardener, 4,4'-methylenebis(2,6-diisopropylaniline), is available from Lonza Group under the tradename Lonzacure® M-DIPA.

Another group of preferred ortho-alkylated aromatic diamine hardeners is represented by structural formula (III):

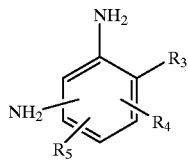

(III)

wherein the amine groups are meta- or para- to each other, R$_3$ is C$_1$–C$_4$ branched or straight chain alkyl, R$_4$ and R$_5$ are independently hydrogen, branched or straight-chain alkyl or methylthio.

It has been discovered that epoxy resin systems having the above-described dicyclopentadiene-phenolic skeleton and ortho-alkylated diamine hardeners provide low moisture absorption similar to or better than most polycyanate and other state-of-the-art matrix materials, while at the same time providing a desirable combination of other important properties including: low microcracking after thermal cycling, good tack, drape, mechanical outlife, and storage life. The instant resin system is compatible with ancillary materials used in prepreg production, such as metal-containing catalysts which may be present in the release paper. The resin system forms a low, cured-resin density which enables lower weight structures to be utilized. This feature is especially desirable for weight-critical applications, such as aerospace applications. The resin systems are amenable to standard epoxy processing, yielding high Tg and good mechanical properties and very little change in mechanical properties under hot and wet conditions.

In many instances it is possible to provide the instant resin systems at lower cost than state of the art polycyanate resins.

A further surprising aspect of the resin systems according to the invention is their utility in resin transfer molding (RTM) processes. RTM processes generally require lower viscosity resin systems. As described at greater length hereafter, the low viscosity of the epoxidized dicyclopentadiene-phenol/ortho-alkylated diamine hardener resin system of the invention is an unexpected feature, which makes the resin system particularly suitable for RTM processes.

Therefore, in another aspect, the invention is directed to a resin transfer molding process comprising the steps of (a) transferring a resin system into a closed mold containing a fibrous substrate; (b) impregnating the resin system into the fibrous substrate; and (c) curing the resin-impregnated fibrous substrate in the mold to produce a resin transfer molded product, wherein the resin system comprises an (i) epoxy of formula (I) above and (ii) an ortho-alkylated aromatic diamine hardener.

The resin systems of the invention also find utility in the manufacture of prepregs for making composite materials. Composite materials made by resin transfer molding or of prepreg materials according to the invention have utility in the manufacture of spacecraft structures including, without limitation, satellite buses, solar array structures, antennae, mirrors, and reflectors. The composites of this invention can be used as aircraft parts, such as wing skins, wing-to-body fairings, floor panels, flaps, radomes, or automotive parts, as bumpers and springs, and as pressure vessels, tanks or pipes. Potentially, the resin systems, prepregs and resin transfer molding products can be used in any composite structure where low moisture absorption and retention of mechanical properties under hot and wet conditions would be advantageous, including, without limitation, industrial, commercial or military aircraft manufacture, sporting goods manufacture as golf shafts, tennis racquets and fishing rods, and the like.

In addition to the manufacture of composite structures produced by resin transfer molding (RTM), the resin systems of the present invention find utility in vacuum assisted resin transfer molding (VARTM), resin film infusion (RFI), and wet filament winding processes, where low resin viscosity and long pot life, are important.

The inventive resin systems also have utility in adhesives applications, as supported or unsupported films or pastes. The resin systems may further be useful in electronics applications as encapsulation or potting materials. The resins may be useful in applications requiring low dielectric materials where change of dielectric constant with moisture absorption would adversely affect the application, such as in composite radomes.

The resin systems may find use in discontinuous fiber materials or otherwise reinforced composite materials (molding compounds) for compression, injection, transfer, and bulk or sheet molding process applications.

DETAILED DESCRIPTION OF THE PREFERRED EMBODIMENTS

The epoxy resin used in the resin system of the invention, which is set forth in the above formula (I), is based on an epoxidized reaction product of phenol and dicyclopentadiene. This hydrocarbon backbone structure has an extremely low molecular polarity, and the epoxy resins based on this backbone exhibit very low moisture absorption.

The epoxidized phenol-dicyclopentadiene copolymer has a general formula I as follows:

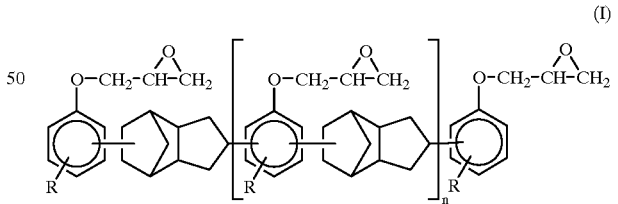

(I)

wherein R is H or halogen and n is from 0 to about 0.5. More preferably, R is hydrogen and n=0.2.

A variety of such resins are now commercially available having differing molecular weights and include hydrocarbon epoxy novolac resins known as TACTIX 556 and TACTIX 71756 available from Ciba-Geigy; XD-1000, XD-1000-L, and XD-1000-2L, available from Nippon Kayaku; and HP-7200 and HP-7200H, available from DIC. The lowest molecular weight and lowest viscosity TACTIX 556 and XD-1000-2L grades are most preferred for use in advanced composite applications.

While the above epoxy resins are known to the art, nevertheless when they are combined with contemporary hardeners, such as 4,4'-DDS (diaminodiphenyl sulfone) or 3,3'-DDS, high viscosity mixtures with poor tack and drape properties generally result. Accordingly, significant modification of such resin systems with other low viscosity resins is required to enhance tack and drape properties, which further detracts from the low moisture absorption characteristic of such systems. Surprisingly, the combination of TACTIX 556 and the state of the art DDS hardeners results in a resin system absorbing more moisture than systems in which TACTIX 556 is combined with the ortho alkylated aromatic diamine hardeners according to the present invention.

The diamine hardeners used in the present invention are ortho-alkylated aromatic diamines. While the diamines of formulas (II) and (III) are most preferred, other ortho-alkylated diamines are useful. For example, systems comprising a,a'-bis (3,5-dimethyl-4-amino)-p-diisopropenylbenzene, formerly available from Shell under the trade name EPON 1062, are expected to yield good resin systems.

A preferred embodiment of the invention involves the use of a resin system containing the epoxy resin of formula (I) above, such as TACTIX 556, and one or more of the dialkylated diamines of formulas (II) or (III). As is known in the art of epoxy resin formulation, the compositions of these mixtures can be varied, resulting in mixtures with varying epoxide-amine hydrogen molar ratios and concomitant physical, chemical and mechanical properties.

In the resin system according to the invention, relative amounts of epoxy resin (epoxide) and ortho-alkylated aromatic diamine components may be expressed in terms of the equivalents of hardener (amine hydrogen) to epoxy resin (epoxide). An equivalent weight of hardener per epoxide of 1.0 occurs when each of the hardener amine hydrogens is replaced with a bond to an epoxide group. For example, in a preferred embodiment, the epoxy resin is TACTIX 556, which has an epoxide equivalent weight of between about 220 and about 240 g/mol, and the amine hardener is LONZACURE® M-MIPA, having a molecular weight of 310.49 g/mol. An amine hydrogen to epoxide equivalents ratio of 1.0 is present when the weight percentages of the epoxy resin and the amine hardener are about 74.3 wt % and about 25.7 wt %, respectively. In general stoichioemetric ratios of 50%–130% of the theoretical amine-epoxide hydrogen equivalence are preferred, and stoichiometric ratios of 70%–110% are most preferred.

In addition, the cure cycles used to polymerize the resin system can also be varied, which can result in variations in degree of cure and in physical, chemical and mechanical properties. In general, the resin cure times range between about 1.0 hour and 8.0 hours and the cure temperatures range between about 100° and 200° C. Because of their low viscosity, long gel time and pot-life, these resin systems are ideal for advanced composite part manufacturing such as RTM and RFI.

Continuous fiber-reinforced unidirectional tapes or woven or non-woven fabric prepregs can be readily produced. Further, the low moisture absorption of these systems makes them especially suitable for manufacture of advanced composite structures for spacecraft.

In accordance with the practice of the invention, the resin formulations described above can be further modified with a variety of materials, singly or in combination, to meet the requirements of a particular process or application. For example, a low viscosity epoxide (epoxide modifier) can be used to increase the tack and drape properties of the resin system. Examples of epoxy materials which can be employed in the resin system include, but are not limited to, Bisphenol F epoxides, such as PY306, GY285, or GY281, available from Ciba, or Rutapox 0158 (Bakelite); phenol novolac epoxides, such as DEN 431, available from Dow, or EPON 160, available from Shell; Bisphenol A epoxides such as Epon 825 or Epon 828, from Shell, or DER332 or DER 331 available from Dow; cycloaliphatic epoxides such as CY179, available from Ciba; glycidyl amine epoxides such as triglycidyl 4-aminophenol (available as MY510 from Ciba or Epon 1076 from Shell), TGMDA, available as MY721, MY9655, and MY9663 from Ciba; Tetraglycidyl-4,4'-methylenebis(2-ethylbenzeneamine) available as MY 722 from Ciba; and others known to those of ordinary skill in the art.

The resin system formulations can also be modified with curing catalysts or accelerators to reduce the gel time, flow characteristics, cure temperature, and/or cure time as desired. Suitable types of accelerators include, without limitation, Lewis acid complexes such as boron trifluoride monoethylamine complex ($BF_3MEA$), boron trifluoride piperidine complex ($BF_3$piperidine) available from Atotech USA, and $BCl_3$ complexes available from Ciba; imidazole derivatives such as 2-phenyl-4-methyl-imidazole (Curezol 2P4MZ) or 2-phenylimidazole (Curezol 2PZ) available from Shikoku Chemicals, and the like, dicyandiamide, substituted urea derivatives such as 3-(3,4-dichlorophenyl)-1,1-dimethyl urea available as Diuron from Dupont, acid salts of tertiary amines, salts of trifluoro methane sulfonic acid, organophosphonium halides and the like.

The base resin system formulations can also be modified with a variety of toughening agents known in the art, including, but not limited to thermoplastics, such as poly (arylethersulfones), available, for example, as PES 5003P from Sumitomo; poly(etherimides), available, for example, as Ultem 1000 from General Electric; or poly(imides), available, for example, as Matrimid 5218 or Matrimid 9725 from Ciba. These toughening agents may be dissolved in the uncured resin matrix or present as undissolved filler particles. In addition elastomers such as 1300×13, 1300×8 1300×18 CTBN, which are reactive liquid polymers from BF Goodrich may be incorporated into the resin system by simple blending or chemical prereaction with one or more of the epoxy resin components. Preformed elastomeric core-shell types of polymeric particles are useful and are readily available to those skilled in the art.

Other fillers and modifiers may also be incorporated into these systems to impart other desired characteristics to the resin matrix. These include without limitation fumed silica, available as Cabosil M5 or TS720 from Cabot, Aerosil US202 from Degussa, and the like, which can be incorporated to increase the viscosity and reduce the flow of the resin composition during processing and cure; pigments such as carbon black to color the composition; antimony oxide and/or brominated epoxy resins to impart flame retardant properties; and thermally or electrically conductive materials such as BN, $Al_2O_3$, silver or aluminum powders to impart thermal and/or electrical conductivity.

A surprising feature of the present invention is that in general the resin systems containing epoxy resin and diamine hardener according to the invention exhibit a lower viscosity than either of the epoxy resin component or the ortho-alkylated diamine hardener component. This "eutectic"-like feature is particularly important since, for example, TACTIX 556 itself is a semi-solid at room temperature and would not ordinarily be expected to form a resin system having a sufficiently low viscosity for use in RTM and prepreg applications. However, when combined with the instant diamene hardener, the resulting system exhibits excellent room temperature viscosity which is achieved without the addition of (plasticizing) components that could ultimately increase the moisture absorption of the resin system.

Low moisture absorption is a critical property of resin systems used in advanced composites for space applications. In such applications it is particularly important that the initial resin systems for forming the prepregs and composites retain their desired properties under hot and wet conditions. To measure moisture absorption a 72-hour boiling water weight gain is determined. As used herein 72-hour boiling water weight gain means the amount of moisture taken up by the resin system when the cured resin system is submerged in boiling water and weighed after seventy-two hours. The weight gain is reported as a percentage, relative to the starting weight.

For the neat resin system, which has not been formed into a prepreg by incorporation into reinforcing material, the desired weight gain is less than about 1.3%. A preferred weight gain range is between about 1.2 and 1.3%. In some embodiments, a seventy-two hour boiling water weight gain of less than 1.2% is possible. When low moisture absorption is critical the lower the weight gain, the better.

Another measure of moisture absorption is weight gain at equilibrium in a 50 percent relative humidity environment. To determine such weight gain a cured resin system according to the invention is oven-dried and exposed to a 50 percent relative humidity (RH) ambient atmosphere at room temperature (RT). The system is allowed to reach equilibrium wherein substantially no water is taken up by the resin system over three successive weighings, and the weight gain of the resin is reported as a weight percentage, relative to the starting weight. Neat resin (i.e. resin that has not been impregnated into a fibrous reinforcement material) according to the invention preferably has a 50 percent relative humidity weight gain less than about 1.0%. More preferably, weight gain under these conditions is less than 0.75% and most preferably less than 0.60%. Again the lower the weight gain, the better.

To evaluate the weight gain of prepreg at equilibrium in a 50% relative humidity environment, 2"×2" laminate samples were machined and predried in an air circulating oven for three to five days at 250° F. The dried samples were weighed and placed into a conditioning chamber maintained at 50% relative humidity at room temperature. Equilibrium is defined as constant weight over three successive weighings. A preferred uncured prepreg according to the invention typically has a 50% relative humidity weight gain of less than 0.40%. In a most preferred embodiment, the weight gain under those conditions is typically less than 0.20%. The seventy-two hour boiling water weight gain of the uncured prepregs is generally less than about 0.50%, more preferably less than 0.40%. The percentage weight gain is with respect to the prepreg, including reinforcement.

Prepregs or preimpregnated reinforcement may be prepared by several techniques known in the art, such as wet winding or hot melt. In one method of making impregnated tow or unidirectional tape, fiber is passed into a bath of the epoxy/hardener mixture. Although unnecessary for most applications a non-reactive, volatile solvent such as methyl ethyl ketone may be optionally included in the resin bath to further reduce viscosity. After impregnation, the reinforcement is passed through a die to remove excess resin, sandwiched between plies of release paper, passed through a set of heated rollers, cooled, and taken up on a spool. The resulting prepreg is used within a few days or may be stored for months at 0° F. During prepreg manufacture, the resin system typically "B-stages", or partially advances through the reinforcement.

Composites may be prepared by curing preimpregnated reinforcement using heat and pressure. Vacuum bag/autoclave cures work well with such compositions. Laminates may also be prepared via wet layup followed by compression molding, resin transfer molding, or by resin injection. Typical cure temperatures are 100° F. to 500° F., preferably 180° F. to 450° F.

Manufacturing composites typically involves laying up a number of sheets of uncured resin-impregnated fibrous substrates (prepregs) on a suitable tool or mandrel and subjecting them to heat and pressure in order to completely impregnate the sheets. The treated sheets become molded to the configuration of the mold and are then subsequently gelled (or crosslinked). The resin is then completely cured by further heat treatment in order to fix the resulting configuration of the molded laminate.

The resin systems of this invention are well suited for filament winding. In this composite fabrication process, continuous reinforcement in the form of tape or tow—either previously impregnated with resin or impregnated during winding—is placed over a rotating and removable form or mandrel in a previously determined pattern. Generally the shape is a surface of revolution and contains end closures. When the proper number of layers are applied, the wound form is cured in an oven or autoclave and the mandrel removed.

In a preferred embodiment, modified or unmodified resin systems are used in conjunction with continuous fiber reinforcements to produce resin-impregnated unidirectional tape or woven fabric (prepreg) materials, which are subsequently used to produce advanced composite parts. In a preferred embodiment, the resin systems comprise between about 30 percent and about 40 percent by weight with respect to the finished, uncured prepreg.

A wide variety of fiber reinforcements are available and can be used in accordance with this invention, including S-glass and E-glass fibers, carbon fibers, aromatic polyamide (Kevlar) fibers, silicon carbide fibers, poly (benzothiazole) and poly(benzimidazole) fibers, poly (benzooxazole) fibers, alumina, titania, quartz fibers, and the like. Selection of the fiber reinforcement type for these materials is determined by the performance requirements for the composite structure. For many spacecraft applications where high stiffness and low weight are critical, high modulus carbon or graphite type fibers are the preferred reinforcement. Examples of this type of fiber include P75, P100, P125 from Amoco, M40J, M55J, M60J from Toray, and K139c from Mitsubishi.

Alternatively, discontinuous, non-woven cloth, whiskers, chopped fiber and mat-type reinforcement materials may also be utilized.

Another method of making composite materials is by resin transfer molding (RTM). This is a process by which a resin system is transfered while at relatively low viscosity and under pressure into a closed mold with all of the important reinforcements and inserts already in place. The resin system can be prepared by premixing and placing the resin system into a resin injection pot or by metering components from separate pots at the appropriate mix ratio to an in-line static mixer or mixing zone. The resin system is then injected into the mold which is maintained under low pressure or under vacuum. The mold is often filled with resin while under vacuum to eliminate air from the mold space, to assist in resin injection and to aid in the removal of volatiles. The viscosity of the resin system dictates whether pot and/or mold heat is required. Low resin viscosity at the injection temperature is desirable to obtain best mold filling and mold wetting. After the mold is filled, it is sealed and heated in accordance with the appropriate cure schedule. The resulting molded part can then be removed from the mold and post-cured as necessary.

In order to achieve good fiber impregnation and low void content during RTM processing, resin viscosity below about 2000 cps at the injection temperature is highly desired, with resin viscosity below 1000 cps being preferred, and below 300 cps, most preferred. Further, the resin system must maintain this low viscosity for a period of time sufficient to completely fill the mold and impregnate the fiber preform. For RTM processing, such time is frequently measured in terms of the pot life of the resin, which can be defined as the time required for the resin to double its viscosity value. A resin pot life of at least 1 hour, and preferably two hours or more, is generally required for production of parts via RTM.

In another preferred embodiment of the invention, modified or unmodified resin systems as described are used in conjunction with woven fabric or non-woven mat reinforcements or preforms to directly produce advanced composite parts via processes such as RTM, RFI, VARTM. In these processes, the resin and fiber are combined during the actual part molding process. Any of the above listed fiber types may be utilized, with the most preferred type being determined by the performance characteristics of the application.

The following Examples are illustrative of the invention and are not intended to limit the scope thereof, which is defined by the appended claims.

EXAMPLE 1

An uncured resin sample was prepared as follows. An epoxy resin component of formula (I) above, having an Epoxide Equivalent Weight (EEW) of 225 g/mol (TACTIX 556), which is a reaction product of phenol, dicyclopentadiene and epichlorohydrin, was preheated to 90° C. 74.7 g of the preheated epoxy resin and 25.3 g methylenebis(2,6-diethylaniline) (Lonzacure® MDEA) were added to a suitable mixing vessel and mixed at 80–100° C. for about 30 minutes, until the hardener was completely dissolved. This resin system had an amine hydrogen to epoxide equivalents ratio of 1.0 which is 100% of the theoretical stoichiometric equivalents. On cooling to room temperature, the mixture was found to be a tacky semisolid, suitable for making tacky, drapable prepreg. The physical properties of the resin system are set forth in Table 1 below. A tack and drape outlife of 33 days was observed, demonstrating that this resin formulation has the stability needed for making prepregs with long tack and drape outlife for advanced composite part manufacture. The low isothermal viscosity and long gel time measured for this resin indicate suitability for applications such as RTM and RFI.

Cured resin castings of 0.08" nominal thickness were prepared by transferring 50 g of the uncured resin mixture to a 6"×4" stainless steel mold pretreated with a mold release agent, vacuum degassing at 80–100° C. for 60 minutes, and curing in an air circulating oven using a heating rate of 1° C./minute and an ultimate hold temperature of 150° C. for four hours. Cured neat resin evaluation results are summarized in Table 1. The low moisture absorption measured in the 72 hour water boil and the room temperature, 50% relative humidity exposure tests demonstrate that this composition is suitable for preparing advanced composite structures for use in spacecraft applications.

EXAMPLE 2

Uncured resin samples were prepared as in Example 1, except 24.3 g methylenebis(2-methyl-6-isopropylaniline) (Lonzacure® M-MIPA) was substituted for the Lonzacure® MDEA. This mixture had an amine hydrogen (hardener) to epoxide (epoxy resin) equivalents ratio of 1.0, 100% of the theoretical stoichiometric equivalents. On cooling to room temperature, the mixture was found to be a tacky semisolid, suitable for making tacky, drapable prepreg. A tack and drape life of 14 days was observed, demonstrating that this resin formulation has the stability needed for making prepregs with long tack and drape outlife for advanced composite part manufacture. Physical properties of the resin are set forth in Table 1 below. The low isothermal viscosity and long gel time measured for this resin indicate suitability for applications such as RTM and RFI.

Cured resin castings were also prepared as in Example 1, except that a cure of 8 hours at 135° C. was used. Cured neat resin evaluation results are also summarized in Table 1. The low moisture absorption measured in the 72 hour water boil and room temperature, 50% relative humidity exposure tests, Tg, and mechanical properties demonstrate that this composition is suitable for preparing composite structures using prepreg or other composite part manufacturing methods such as RTM or RFI which may be used in spacecraft applications or other applications where low moisture absorption is desirable.

EXAMPLE 3

Uncured resin samples were prepared as in Example 1, except that 71.0 g TACTIX 556 and 29.0 g methylenebis(2,6-diisopropylaniline) (Lonzacure® M-DIPA) were used. This mixture had an amine hydrogen to epoxide equivalents ratio of 1.0, 100% of theoretical stoichiometric equivalents. On cooling to room temperature, the mixture was found to be a tacky semisolid, suitable for making a tacky, drapable prepreg. A tack and drape life of 11 days was observed.

Cured resin castings were also prepared as in Example 1, with the exception that a cure of 2 hours at 180° C. was used. Physical properties of the uncured resin, and cured neat resin evaluation results are also summarized in Table 1.

EXAMPLE 4

Uncured resin samples were prepared as in Example 1, except that 83.6 g TACTIX 556 and 16.4 g diethyltoluenediamine available under the trade name Curing Agent W, from Shell Chemical were used. This mixture had an amine hydrogen to epoxide equivalents ratio of 1.0, 100% of theoretical stoichiometric equivalents. On cooling to room temperature, the mixture was found to be a tacky semisolid, suitable for making tacky, drapable prepreg. A tack and drape life of 10 days was observed.

Cured resin castings were also prepared as in Example 1, with the exception that a cure of 2 hours at 150° C. was used. Physical properties of the uncured resin, and cured neat resin evaluation results are also summarized in Table 1.

To determine tack life of uncured prepreg, small prepreg samples were stored at room temperature in a sealed bag. Periodically, the samples were checked by touching with a finger (with gloves) and/or folding the material over on itself and applying light pressure. The material was said to have tack if sticky to the touch or if it would adhere to itself.

To determine drape life, small prepreg samples were stored at room temperature in a sealed bag. Periodically, the samples were checked by bending. If the prepreg was soft and pliable and capable of bending without breaking fibers, cracking, or breaking, it was said to have drape.

Tg (glass transition temperature) was measured using a TA Instruments Model 983 Dynamic Mechanical Analyzer (DMA) with a 5° C./min heating rate. Specimens were tested "as is", without predrying or preconditioning, after predrying 24 hours at 180° F. in an air circulating oven, after a 48 hour water boil [no predry, or after a 20 day exposure at 160° F. and 95% RH [no predry]. The Tg determined from the E' curve is reported as the Tg of the material.

To determine Tg by Differential Scanning Calorimetry (DSC), testing was performed on a TA Instruments Model 2910 with a ramp rate of 10° C./min. Tg and residual heat of reaction are determined using the instrument software.

TABLE 1

| EXAMPLE# | 1 | 2 | 3 | 4 |
|---|---|---|---|---|
| FORMULATION: | | | | |
| TACTIX 556, wt % | 74.7 | 74.7 | 71 | 83.6 |
| Lonzacure MDEA, wt % | 25.3 | 0 | 0 | 0 |
| Lonzacure MMIPA, wt % | 0 | 25.3 | 0 | 0 |
| Lonzacure MDIPA, wt % | 0 | 0 | 29 | 0 |
| Curing Agent W, wt % | 0 | 0 | 0 | 16.4 |
| Amine/epoxide stoichiometry, % | 100 | 100 | 100 | 100 |
| UNCURED RESIN EVALUATION | | | | |
| Tack and drape life, days | 33 | 14 | 11 | 10 |
| 75° viscosity, cps | 500 | 1100 | 470 | 600 |
| 150° gel time, minutes | >90 | >60 | >90 | >60 |
| CURED RESIN EVALUATION | | | | |
| Cure cycle | 4 HR@ 150° C. | 8 HR@ 135° C. | 2 HR@ 180° C. | 2 HR@ 150° C. |
| DMA Tg, ° C. | | 146 | 161 | |
| DSC Tg, ° C. | 151 | | 156 | 125 |
| Room Temp., 50% RH equilibrium weight gain, % | 0.38 | 0.38 | 0.54 | 0.41 |
| 72 hour boiling water weight gain, % | 1.0 | 0.7 | 0.9 | 1.2 |
| Comp. Yield stress, ksi* | | 19.3 | 18.5 | |
| RT flex strength, ksi** | | 17.3 | 18 | |
| RT flex modulus, msi | | 0.49 | 0.42 | |
| Fracture toughness:*** | | 1.07 | 0.81 | |
| $K_{1C}$, MPaM | | 308 | 264 | |
| $G_{1C}$, JM² | | | | |
| Specific gravity**** | | 1.14 | 1.11 | |

*Compression Testing was performed in accordance with ASTM D695.
**Flexural strength and modulus were determined in accordance with ASTM D790.
***Fracture toughness was measured using a 3-point notched bending (also known as single edge notched beam or SENB) specimen configuration in accordance with ASTM E399. $G_{1C}$, the critical strain energy release rate, and $K_{1C}$, the critical stress intensity factor, are both determined from this test.
****Specific gravity was determined in accordance with ASTM D792.

The resin systems of Examples 1 through 4 all exhibit properties making them suitable for use with advanced composite manufacturing processes such as prepreg and RTM.

As can be seen from the preceding examples, considerable variation in cure schedules can be successfully utilized with these resin compositions. Generally, cure times range between about 0.50 and about 10 hours, and cure temperatures vary between about 100° C. and 300° C., depending on the Tg, service temperature, moisture absorption, and mechanical property requirements of a particular application.

Comparative Example C1

Uncured resin samples were prepared as in Example 1 using 78.4 g TACTIX 556 and 21.6 g 3,3'-diaminodiphenylsulfone (DDS). This mixture had an amine hydrogen to epoxide ratio of 1.0, 100% of theoretical stoichiometric equivalents. On cooling to room temperature, the mixture was found to be a non-tacky solid and was deemed unsuitable for making tacky, drapable prepreg. Physical properties of the resin sample are summarized in Table 2. The high isothermal viscosity measured indicates that this resin formulation would not be suitable for use in RTM or RFI processes.

Cured resin castings were prepared as in Example 1 using a cure of 2 hours at 180° C. Cured resin evaluations are set forth in Table 2. The 72 hour water boil weight gain results were found to be significantly greater than those of Examples 1 through 4, confirming the lowered moisture absorption of resin systems according to the invention, as compared to a system using the contemporary DDS hardeners.

Comparative Example C2

Uncured resin samples were prepared as in Example 1 using 78.4 g TACTIX 556 and 21.6 g 4,4'-diaminodiphenylsulfone (DDS). This mixture had an amine hydrogen to epoxide molar ratio of 1.0, 100% of theoretical stoichiometric equivalents. On cooling to room temperature, the mixture was found to be a non-tacky solid, unsuitable for making tacky, drapable prepreg. Physical properties of the resin sample are summarized in Table 2. The high isothermal viscosity measured indicates that this resin formulation would not be suitable for use in RTM or RFI processes.

Cured resin castings were prepared as in Example 1 using a cure of 2 hours at 180° C. Cured resin evaluations are also summarized in Table 2.

Comparative Example C3

Uncured resin samples were prepared as in Example 1 using 68.6 g TACTIX 556 and 31.4 g 2,2-Bis[4-(4-aminophenoxy)phenyl]propane (BAPP) available from Wakayama Seika. This mixture had an amine hydrogen to epoxide ratio of 1.0, 100% of theoretical stoichiometric equivalents. On cooling to room temperature, the mixture was found to be a non-tacky solid, unsuitable for making tacky, drapable prepreg. The high isothermal viscosity measured indicates that this resin formulation would not be suitable for use in RTM or RFI processes.

Cured resin castings were prepared as in Example 1 using a cure of 4 hours at 150° C. A summary of physical properties is provided in Table 2.

TABLE 2

| COMPARATIVE EXAMPLE # | C1 | C2 | C3 |
|---|---|---|---|
| FORMULATION: | | | |
| TACTIX 556, wt % | 78.4 | 78.4 | 68.6 |
| 3,3'-DDS, wt % | 21.6 | 0 | 0 |
| 4,4'-DDS, wt % | 0 | 21.6 | 0 |
| BAPP, wt % | 0 | 0 | 31.4 |
| Amine/epoxide stoichiometry, % | 100 | 100 | 100 |
| UNCURED RESIN EVALUATION | | | |
| Tack and drape life, days | 0 | 0 | 0 |
| 75° C. viscosity, cps | 25000 | 32000 | 10000 |
| 150° C. gel time, minutes | 51 | >60 | 17 |

TABLE 2-continued

| COMPARATIVE EXAMPLE # | C1 | C2 | C3 |
|---|---|---|---|
| CURED RESIN EVALUATION | | | |
| Cure cycle | 2 HR@ 180° C. | 2HR@ 180° C. | 4HR@ 150° C. |
| DMA Tg, ° C. | 182 | 163 | |
| DSC Tg, ° C. | 178 | 153 | 166 |
| 72 hour water boil weight gain, % | 1.7 | 1.7 | 1.1 |
| RT 50% RH weight gain, % | 0.61 | — | 0.51 |

EXAMPLE 5

In order to more fully illustrate the low viscosity and long pot life characteristics of the resin systems according to the invention which make them especially suitable for composite part manufacture using RTM, isothermal viscosity was measured using two samples identified as (No. 5 and No. 5A) of the uncured resin produced in Example 2.

The results of the isothermal viscosity tests presented in Table 3 demonstrate the low viscosity and long pot life of this composition, and its suitability for use in RTM process applications.

Comparative Example C4

For comparison, additional viscosity data was gathered on an uncured resin sample prepared as in Comparative Example C3. The data obtained is summarized in Table 3. The high resin viscosity and short pot life at 75° C. demonstrate the unsuitability of this composition for use in RTM process applications. Further heating of this resin to reduce viscosity would only further shorten the pot life.

TABLE 3

| ISOTHERMAL VISCOSITY | | | |
|---|---|---|---|
| Resin system | C4 | No. 5 | No. 5A |
| Temperature (° C.) | 75 | 110 | 120 |
| Initial viscosity (cps) | 10,000 | 133 | 151 |
| Final viscosity* (cps) | 24,500 | 265 | 380 |
| Pot life** (mins) | 20 | 120 | 100 |

*Reached after 120 minutes for the Resin System of Example 2 and after 30 minutes for the Resin System of Comparative Example 4.
**Time to double initial viscosity

EXAMPLE 6

Uncured resin samples were prepared as in Example 1, except that 77.3 g TACTIX 556 and 22.7 g Lonzacure® M-MIPA were used. This mixture had an amine hydrogen to epoxide ratio of 0.85 which represents 85% of theoretical stoichiometric equivalents. On cooling to room temperature, the mixture was found to be a tacky semisolid, suitable for making tacky, drapable prepregs. A tack and drape life of 19 days was observed.

Cured resin castings were also prepared as in Example 1, with the exception that a cure of 6 hours at 150° C. was used.

EXAMPLE 7

Uncured resin samples were prepared as in Example 1, except that 72.4 g TACTIX 556 and 27.6 g Lonzacure® M-MIPA were used. This mixture had an amine hydrogen to epoxide ratio of 1.10 which is 110% of the theoretical stoichiometric equivalents of hardener to epoxide. On cooling to room temperature, the mixture was found to be a tacky semisolid, suitable for making tacky, drapable prepreg. A tack and drape life of 10 days was observed.

Cured resin castings were also prepared as in Example 1, with the exception that a cure of 6 hours at 150° C. was used.

The physical properties of the uncured and cured resin systems of Examples 6 and 7 are summarized in Table 4 below. The data demonstrate that these resin formulations have the stability needed for making prepregs with long tack and drape outlife necessary for advanced composite manufacture. The low moisture absorption, Tg and mechanical properties demonstrate the utility of the resin system for composites in spacecraft applications. It can be seen from Examples 6 and 7 that resin compositions with a wide range of amine hydrogen to epoxide ratios can be successfully employed within the scope of this invention.

EXAMPLE 8

An uncured resin composition was prepared by preheating TACTIX 556 and Lonzacure® M-MIPA separately to 90° C. 63.0 parts of this preheated epoxy resin and 7.6 parts of triglycidyl 4-aminophenol epoxy resin with an EEW of 101 g/mole, available under the tradename MY 510 from Ciba-Geigy, were added to a heated mixing vessel and thereafter mixed at 80–100° C. until the mixture was uniform. While continuing to mix, 2.0 parts Matrimid 9725 was added and the mixture was heated to 121° C. While continuing to mix, 1.6 parts of finely powdered fumed silica, available under the tradename Aerosil US202 from Degussa, was slowly added over 30 minutes. The mixture was then stirred for an additional 15 minutes at that temperature.

The mixture was then cooled to 80° C. and 25.8 parts of the preheated Lonzacure® M-MIPA was added. Mixing was continued at 80° C. for 20 minutes. The resin mixture was then removed from the mixing vessel and allowed to cool. This mixture had an amine hydrogen to epoxide ratio of 0.93 which is 93% of theoretical stoichiometric equivalents. On cooling to room temperature, the mixture was found to be a tacky semisolid, suitable for making tacky, drapable prepreg. A tack and drape life of 15 days was observed, demonstrating that this resin formulation has the stability needed for making prepregs with long tack and drape outlife for composite part manufacture.

Cured resin castings were also prepared as in Example 2, with the exception that a cure of 4 hours at 150° C. was used. Cured neat resin evaluation results are summarized in Table 4.

EXAMPLE 9

An uncured resin composition was prepared by preheating TACTIX 556 to 90° C. 60.5 parts of this preheated epoxy resin and 9.6 parts MY 510 were added to a heated mixing vessel and mixed at 80–100° C. until the mixture was uniform. While continuing to mix, 2.0 parts Matrimid 9725 was added and the mixture was heated to 121° C. While continuing to mix, 2.0 parts of finely powdered fumed silica (Cabosil TS 720 from Cabot) was slowly added over 20 minutes. The mixture was then stirred for an additional 40 minutes at that temperature. The mixture was then cooled to 70° C. and 20.0 parts Lonzacure® M-MIPA and 5.8 parts Lonzacure® MDEA were added.

Mixing was continued at 70° C. for 15 minutes, after which time 0.1 parts of finely ground boron trifluoride monoethylamine complex (from Atotech USA) was added. The resin mixture was stirred for 10 minutes and then removed from the mixing vessel and allowed to cool. This mixture had an amine hydrogen to epoxide ratio of 0.91 which represents 91% of theoretical stoichiometric equivalents. On cooling to room temperature, the mixture was found to be a tacky semisolid, suitable for making tacky, drapable prepreg. A tack and drape life of 14 days was observed demonstrating that this resin formulation has the stability needed for making prepregs with long tack and drape outlife for composite part manufacture.

Cured resin castings were prepared from the above resin system according to the procedure of Example 2, with the exception that a cure of 4 hours at 135° C. was used. Cured neat resin evaluation results are summarized in Table 4.

EXAMPLE 10

An uncured resin composition was prepared by preheating TACTIX 556 to 90° C. Two premixes were prepared. A hardener premix was prepared by adding 8.3 parts of methylenebis(2,6-diisopropylaniline) (Lonzacure® M-DIPA) to a suitable mixing container, heating to 80° C., adding 17.5 parts Lonzacure® M-MIPA, and stirring until the M-MIPA was completely dissolved.

The hardener premix was kept at 80° C. until needed. A catalyst premix was prepared by heating 5 parts GY 285 epoxy resin to 50° C. in a suitable mixing container, adding 0.13 parts boron trifluoride monoethylamine complex, and mixing until this material was fully dissolved. The catalyst premix was allowed to cool to room temperature and was kept until needed.

Thereafter, 59.07 parts of preheated TACTIX 556 and 5.0 parts GY 285 were added to a heated mixing vessel and mixed at 80–100° C. until a uniform mixture was formed. While continuing to mix, 4.0 parts Matrimid 9725 was added and the mixture was heated to 121° C. The mixture was then stirred for 45 minutes at that temperature.

The mixture was then cooled to 80° C. An additional 1.0 parts of Matrimid 9725 and 25.8 parts of the hardener premix was added, and the mix was stirred at 80° C. for 15 minutes.

The mixture was then cooled to 70° C., and 5.13 parts of the catalyst premix were added. The resin mixture was stirred for 5 minutes and then removed from the mixing vessel and allowed to cool. This mixture had an amine hydrogen to epoxide molar ratio of 0.97, 97% of theoretical stoichiometric equivalence. On cooling to room temperature, the mixture was found to be a tacky semisolid, suitable for making tacky, drapable prepreg.

Cured resin castings were prepared as in Example 2, with the exception that a cure of 6 hours at 135° C. was used. Cured neat resin evaluation results are summarized in Table 4. Unless otherwise indicated all amounts of ingredients are in weight %.

TABLE 4

| EXAMPLE# | 6 | 7 | 8 | 9 | 10 |
|---|---|---|---|---|---|
| FORMULATION: | | | | | |
| TACTIX 556 | 77.3 | 72.4 | 63.0 | 60.5 | 59.07 |
| Lonzacure ® M-MIPA | 22.7 | 27.6 | 25.8 | 20.0 | 17.5 |
| Lonzacure ® M DEA | — | — | — | 5.8 | — |
| Lonzacure ® M-DIPA | — | — | — | — | 8.3 |
| MY-510 | — | — | 7.6 | 9.6 | — |
| GY-285 | — | — | — | — | 10.0 |
| Matrimid 9725 | — | — | 2.0 | 2.0 | 5.0 |
| Aerosil US 202 | — | — | 1.6 | — | — |
| Cabosil TS 720 | — | — | — | 2.0 | — |
| BF$_3$MEA | — | — | — | 0.1 | 0.13 |
| Amine/epoxide stoichiometry | 85 | 110 | 93 | 91 | 97 |
| UNCURED RESIN EVALUATION | | | | | |
| Tack and drape life, days | 19 | 10 | 15 | 14 | — |
| 75° C. viscosity (cps) | 600 | 700 | — | — | — |
| 150° gel time, minutes | >60 | >60 | — | — | — |
| CURED RESIN EVALUATION | | | | | |
| Cure cycle | 6 HR @ 150° C. | 6 HR @ 150° C. | 4 HR @ 150° C. | 4 HR @ 135° C. | 6 HR @ 135° C. |
| DMA Tg, ° C. | 146 | 153 | 160 | 143 | 149 |
| DSC Tg, ° C. | 151 | 160 | 163 | — | 148 |
| RT 50% RH weight gain, % | 0.4 | 0.42 | 0.57 | 0.51 | 0.57 |
| 72-hour water boil weight gain, % | 0.7 | 0.8 | 1.0 | 1.1 | 1.1 |
| Comp. yield stress, KSI | 20.7 | 21.8 | 24.4 | 21.1 | 21.4 |
| RT flex strength, KSI | 20.4 | 16.9 | 15.4 | 12.3 | 12.4 |
| RT flex modulus, MSI | 0.47 | 0.45 | 0.43 | 0.48 | 0.46 |
| K$_{1c}$, MPaM | 0.78 | 0.84 | 0.79 | 0.98 | 1.02 |
| G$_{1c}$, J/M$^2$ | 221 | 248 | 236 | 253 | 384 |

EXAMPLE 11

Uncured resin was prepared with the composition and following the general procedure of Example 8. Resin films cast onto release paper were used to prepare unidirectional tape prepreg using high modulus PAN-based carbon fibers, available under the tradename M55JB-6000-50B from Toray, with a 71.4 g/m$^2$ fiber areal weight. The prepreg had a 36.7% resin content. This prepreg was found to have tack and drape properties suitable for advanced composite part manufacture. Laminates were prepared employing autoclave curing under vacuum and 85 psi pressure at a heating rate of 3° F./min and a final hold at 300° F. for 4 hours.

Short Beam Shear Strength [SBSS] testing was performed on 32 ply unidirectional laminates in accordance with Standard SACMA SRM-8. 0° Compression tests (in accordance with Standard SACMA SRM-2), 0° Tensile tests, DMA Tg testing and RT, 50% RH weight gain tests were performed on 16 ply unidirectional laminates. These are conventional industry tests. Microcracking resistance during thermal cycling was evaluated on 32 ply quasi-isotropic laminate specimens. A +200° F. to −200° F. thermal cycle with a 15 minute hold time and 10° F./min heating and cooling rate for 100 cycles was used. Results are summarized in Table 5.

The small weight gain measured (0.18%) after room temperature, 50% relative humidity conditioning to equilibrium demonstrates the very low moisture absorption of this material as compared to contemporaneous toughened epoxy prepreg systems, and state of the art polycyanate based systems. (Typical weight gain measured for toughened epoxy prepreg systems of the prior art under similar conditions are typically greater than about 0.5%.) The low moisture absorption and good microcracking resistance make this material especially well suited for manufacture of spacecraft structures. Further, very high retention of mechanical properties is observed after moisture conditioning as well as maintenance of the initial Tg, showing this material is especially suitable for high performance composite applications where retention of properties under hot and wet conditions is required. Decreases in Tg of 20–50° C. after moisture conditioning are typical of current toughened epoxy prepreg systems. In addition, the high open hole compressive strength measured after wet conditioning is of particular significance as this property is often a limiting factor in composite parts design for aerospace applications.

EXAMPLE 12

Uncured resin was prepared with the composition and following the general procedure of Example 9. Resin films were cast onto release paper and were used to prepare unidirectional tape prepreg using high modulus PAN-based carbon fibers (M55JB-6000-50B, Toray) with a 70.0 g/m² fiber areal weight and 35.7% resin content. This prepreg was found to have tack and drape properties suitable for composite part manufacture. Laminates were prepared for mechanical property testing by autoclave curing under vacuum and 85 psi pressure using a heating rate of 3° F./min and a final hold at 275° F. for 4 hours. Short Beam Shear Strength [SBSS] was performed on 32 ply unidirectional laminates. 0° Compression, DMA Tg and RT, 50% RH weight gain tests were performed on 16 ply unidirectional laminates. Microcracking resistance during thermal cycling was evaluated on 32 ply quasi-isotropic laminate specimens. A +250° F. to −250° F. thermal cycle with a 5 minute hold time and 20° F./min heating and cooling rate for 100 cycles was used. Results are summarized in Table 5.

Again, the weight gain measured (0.23%) after room temperature, 50% relative humidity conditioning to equilibrium demonstrates the low moisture absorption of this material as compared to current toughened epoxy prepreg systems. The low moisture absorption, microcracking resistance, and mechanical properties demonstrate that this material is especially well suited for manufacture of spacecraft structures.

EXAMPLE 13

Uncured resin was prepared with the composition and following the general procedure of Example 10. Resin films were cast onto release paper and were used to prepare unidirectional tape prepreg using high modulus PAN-based carbon fibers (M55JB-6000-50B from Toray) with a 69.7 g/m² fiber areal weight and 37.3% resin content. Laminates were prepared for mechanical property testing by autoclave curing under vacuum and 85 psi pressure using a heating rate of 3° F./min and a final hold at 300° F. for 6 hours. Short Beam Shear Strength [SBSS] was performed on 32 ply unidirectional laminates. 0° Compression, DMA Tg and RT, 50% RH weight gain tests were performed on 16 ply unidirectional laminates. Microcracking resistance during thermal cycling was evaluated on 32 ply quasi-isotropic laminate specimens. A +200° F. to −200° F. thermal cycle with a 15 minute hold time and 10° F./min heating and cooling rate for 100 cycles was used. Results are summarized in Table 5.

As with the immediately preceding examples, the weight gain measured (0.21%) after room temperature, 50% relative humidity conditioning to equilibrium demonstrates the low moisture absorption of this material as compared to current toughened epoxy prepreg systems. The low moisture absorption, microcracking resistance, and mechanical properties demonstrate that this material is especially well suited for manufacture of spacecraft structures.

TABLE 5

| PREPREG EVALUATIONS | | | |
|---|---|---|---|
| EXAMPLE# | 11 | 12 | 13 |
| 32 PLY UNIDIRECTIONAL LAMINATE TESTING | | | |
| Cured ply thickness, mil | 2.28 | 2.59 | 2.56 |
| SBSS, KSI | | | |
| RT | 12.0 | 11.2 | 10.5 |
| 200° F. | 8.9 | 7.8 | 9 |
| 250° F. | 7.9 | 5.8 | 7.7 |
| 16 PLY UNIDIRECTIONAL LAMINATE TESTING | | | |
| Cured ply thickness, mil | 2.57 | 2.21 | 2.81 |
| RT 0° tensile strength, ksi | 301 | — | 270 |
| RT 0° tensile modulus, msi | 45.0 | — | 39.3 |
| RT 0° tensile strain, micro in/in | 6460 | — | 6644 |
| 0° compression strength, ksi | | | |
| RT | 130 | 136 | 130 |
| 250° F. | 119 | — | — |
| DMA Tg (° C.) | | | |
| E' | 179 | 158 | 187 |
| E" | 185 | 164 | 192 |
| Tan delta | 189 | 170 | 196 |
| DMA Tg (° C.) (wet)* | | | |
| E' | 167 | — | 174 |
| E" | 174 | — | 180 |
| Tan delta | 179 | — | 184 |
| RT, 50% RH weight gain, % | 0.18 | 0.23 | 0.21 |
| 32 PLY QUASI-ISOTROPIC LAMINATE TESTING | | | |
| Microcracking after 100 thermal cycles (cracks/inch) | 0 | 0.25 | 0 |

*After 48 hours boil

It will be apparent to one of ordinary skill in the art that other modifications and embodiments are possible. This invention is not to be limited except as set forth in the following claims.

I claim:

1. A low moisture-absorbing resin system comprising:

(a) an epoxy resin having structural formula (I):

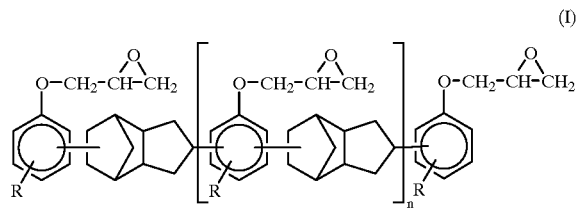

wherein R is hydrogen or halogen and n is from 0 to 0.5; and (b) an ortho-alkylated aromatic diamine hardener, wherein said ortho-alkylated aromatic diamine hardener is of structural formula (II):

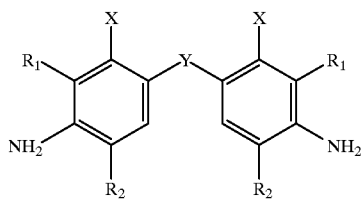

(II)

wherein Y is a direct bond, sulfur, oxygen, methyl, substituted methyl, or sulfoxy, $R_1$ and $R_2$ are $C_1$–$C_4$ straight chain or branched alkyl groups, and X is hydrogen, chlorine or bromine, or, wherein said ortho-alkylated aromatic diamine hardener is of structural formula (III):

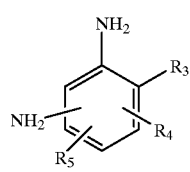

(III)

wherein the —$NH_2$ groups are in the meta- or para-position to each other, $R_3$ is branched or straight chain alkyl, and $R_4$ and $R_5$ are each hydrogen, $C_1$–$C_4$ branched or straight chain alkyl or methylthio.

2. The low moisture-absorbing resin system of claim 1 wherein the ortho-alkylated aromatic diamine hardener is of structural formula (II).

3. The low moisture-absorbing resin system of claim 1 wherein the ortho-alkylated aromatic diamine hardener is of structural formula (III).

4. The low moisture-absorbing resin system of claim 1 wherein R is hydrogen.

5. The low moisture-absorbing resin system of claim 1, wherein Y is methyl and $R_1$ and $R_2$ are each ethyl.

6. The low moisture-absorbing resin system of claim 1, wherein Y is methyl and $R_1$ and $R_2$ are each isopropyl.

7. The low moisture-absorbing resin system of claim 1, wherein Y is methyl, $R_1$ is methyl and $R_2$ is isopropyl.

8. The low moisture-absorbing resin system of claim 1, wherein $R_3$ is $C_1$–$C_4$ branched or straight chain alkyl.

9. The low moisture-absorbing resin system of claim 1, wherein the ortho-alkylated diamine hardener is diethyltoluenediamine.

10. The low moisture-absorbing resin system of claim 1 wherein from about 0.5 to about 1.3 equivalents of the hardener are present per equivalent of the epoxy resin.

11. The low moisture-absorbing resin system of claim 10 wherein from about 0.7 to 1.1 equivalents of the epoxy resin are present per equivalent of the hardener.

12. The low moisture-absorbing resin system of claim 1, having a seventy-two hour boiling water weight gain of less than about 1.3 percent.

13. The low moisture-absorbing resin system of claim 1, having a weight gain of less than about 1.0 percent at equilibrium in a 50% relative humidity environment.

14. The low moisture-absorbing resin system of claim 1, having a viscosity at room temperature lower than a viscosity of either the epoxy resin or the diamine hardener at room temperature.

15. The low moisture-absorbing resin system of claim 1, further comprising a filler or modifier in an amount between about 0.1 and about 3.0 weight percent with respect to the resin system.

16. The low-moisture absorbing resin system of claim 15, wherein said filler or modifier is silica, aluminum oxide, antimony oxide, carbon black, brominated epoxy resin, silver powder or aluminum powder.

17. The low-moisture absorbing resin system of claim 16, wherein said filler is fumed silica.

18. The low-moisture absorbing resin system of claim 1, further comprising a second epoxy material having a lower viscosity than said epoxy resin of formula (I).

19. The low-moisture absorbing resin system of claim 18, wherein said second epoxy is a bisphenol F epoxy, phenol novolac epoxy, bisphenol A epoxy, cycloaliphatic epoxy, glycidyl amine epoxy or mixtures thereof.

20. The low-moisture absorbing resin system of claim 1 including a curing catalyst.

21. The low-moisture absorbing resin system of claim 20, wherein said curing catalyst is trifluoride monoethylamine complex, boron trifluoride piperidine complex, boron trichloride complex, substituted or unsubstituted imdidazole, dicyandiamide, or substituted or unsubstituted urea.

22. The low-moisture absorbing resin system of claim 1, wherein n is about 0.2.

23. The low-moisture absorbing resin system of claim 1, in which a mixture of ortho alkylated aromatic diamine hardeners is present.

24. A prepreg comprising:

a fibrous substrate impregnated with a resin system, said system comprising:

(a) an epoxy resin of structural formula (I),

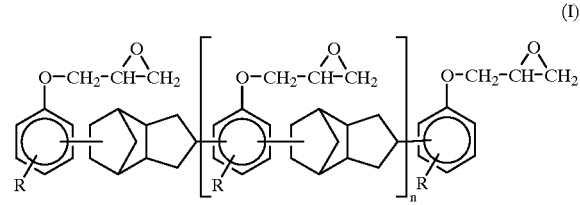

(I)

wherein R is hydrogen or halogen and n is from 0 to 0.5; and (b) an ortho-alkylated aromatic diamine hardener, wherein said ortho-alkylated aromatic diamine hardener is of structural formula (II):

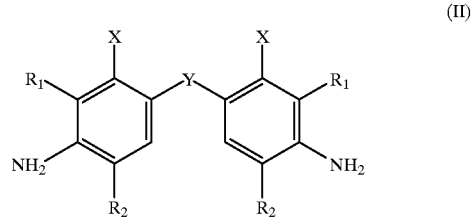

(II)

wherein Y is a direct bond, sulfur, oxygen, methyl, substituted methyl, or sulfoxy, $R_1$ and $R_2$ are $C_1$–$C_4$ straight chain or branched alkyl groups, and X is hydrogen, chlorine or bromine, or, wherein said ortho-alkylated aromatic diamine hardener is of structural formula (III):

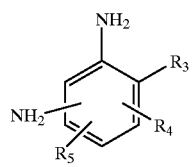

(III)

wherein the —NH$_2$ groups are in the meta- or para-position to each other, R$_3$ is branched or straight chain alkyl, and R$_4$ and R$_5$ are each hydrogen, C$_1$–C$_4$ branched or straight chain alkyl or methylthio.

25. The prepreg of claim 24 wherein the ortho-alkylated aromatic diamine hardener is of structural formula (II).

26. The prepreg of claim 24 wherein the ortho-alkylated aromatic diamine hardener is of structural formula (III).

27. The prepreg of claim 24 having a seventy-two hour boiling water weight gain of less than about 0.5 percent.

28. The prepreg of claim 24, having a weight gain of less than about 0.3 percent at equilibrium in a 50% relative humidity environment.

29. The prepreg of claim 24, wherein said resin system comprises from about 30 to about 40 percent by weight of the total weight of said prepreg.

30. The prepreg of claim 24, wherein said fibrous substrate comprises glass fibers, carbon fibers aromatic polyamide fibers, poly(benzoxazole) fibers or quartz fibers.

31. The prepreg of claim 24 wherein Y is methyl and R$_1$ and R$_2$ are each ethyl.

32. The prepreg of claim 24, wherein Y is methyl, and R$_1$ and R$_2$ are each isopropyl.

33. The prepreg of claim 24, wherein Y is methyl, R$_1$ is methyl and R$_2$ is isopropyl.

34. The prepreg of claim 24, wherein R$_3$ is C$_1$–C$_4$ branched or straight chain alkyl.

35. The prepreg of claim 24, wherein the ortho-alkylated diamine hardener is diethyltoluenediamine.

36. The prepreg of claim 24, wherein the resin system further includes an additive comprising a filler, pigment, or modifier in an amount between about 0.1 and 3.0 weight percent based on the total weight of the resin system.

37. The prepreg of claim 36, wherein said additive is fumed silica, aluminum oxide, antimony oxide, carbon black, brominated epoxy resin, silver powder, aluminum powder or mixtures thereof.

38. The prepreg of claim 37, wherein said additive is a fiber reinforcement.

39. The prepreg of claim 24, wherein said resin system further comprises a second epoxy material having a lower viscosity than said epoxy resin having structural formula (I).

40. The prepreg of claim 39, wherein said second epoxy material comprises a bisphenol F epoxy, phenol novolac epoxy, bisphenol A epoxy, cycloaliphatic epoxy, or glycidyl amine epoxy.

41. The prepreg of claim 24, wherein said resin system contains an accelerator.

42. The prepreg of claim 41, wherein said accelerator is boron trifluoride monoethylamine complex, boron trifluoride piperidine complex, boron trichloride complex, substituted or unsubstituted imidazole, dicyandiamide, or substituted or unsubstituted urea.

43. The prepreg of claim 24, wherein n is about 0.2.

44. The prepreg of claim 24, wherein said system comprises a mixture of ortho-alkylated aromatic diamine hardeners.

45. A composite prepared by curing said prepreg of claim 24.

46. A resin transfer molding process comprising the steps of (a) transferring a resin system into a closed mold containing a fibrous substrate; (b) impregnating the resin system into the fibrous substrate; and (c) curing the resin impregnated fibrous substrate the mold to form a resin transfer molded product, wherein the resin system comprises (i) an epoxy resin of structural formula (I):

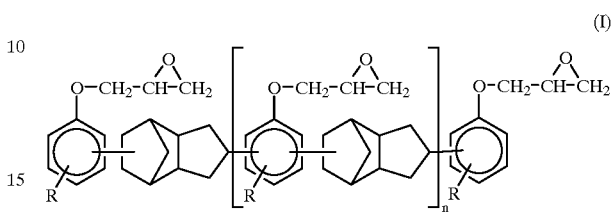

(I)

wherein R is hydrogen or halogen and n is from 0 to 0.5; and (ii) an ortho-alkylated aromatic diamine hardener, wherein said ortho-alkylated aromatic diamine hardener is of structural formula (II):

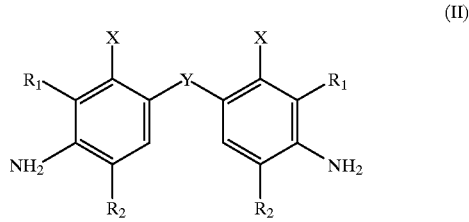

(II)

wherein Y is a direct bond, sulfur, oxygen, methyl, substituted methyl, or sulfoxy, R$_1$ and R$_2$ are C$_1$–C$_4$ straight chain or branched alkyl groups, and X is hydrogen, chlorine or bromine, or, wherein said ortho-alkylated aromatic diamine hardener is of structural formula (III):

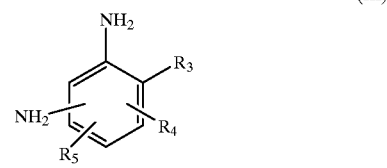

(III)

wherein the —NH$_2$ groups are in the meta- or para-position to each other, R$_3$ is branched or straight chain alkyl, and R$_4$ and R$_5$ are each hydrogen, C$_1$–C$_4$ branched or straight chain alkyl or methylthio.

47. The resin transfer molding process of claim 46 wherein in structural formula (I) n is 0.2, R is hydrogen, and during said transferring step (a), said resin system has a viscosity of less than about 3000 cps.

48. A resin transfer molded product made by the process of claim 46.

49. The resin transfer molding process of claim 46 wherein the ortho-alkylated aromatic diamine hardener is of structural formula (II).

50. The resin transfer molding process of claim 46 wherein the ortho-alkylated aromatic diamine hardener is of structural formula (III).

* * * * *